United States Patent [19]

Wigley

[11] Patent Number: 4,579,693
[45] Date of Patent: Apr. 1, 1986

[54] LIQUID/GAS CONTACT MEANS

[76] Inventor: Albert F. Wigley, c/o Visco Ltd., Stafford Rd., Croydon CR9 4DT, United Kingdom

[21] Appl. No.: 575,922

[22] Filed: Feb. 1, 1984

[30] Foreign Application Priority Data

Feb. 19, 1983 [GB] United Kingdom ............... 8304683

[51] Int. Cl.$^4$ ............................................. B01F 3/04
[52] U.S. Cl. ......................... 261/112; 261/DIG. 11; 428/184
[58] Field of Search ...................... 261/112, DIG. 11; 55/257 R; 428/116, 185, 184; 165/166, 60, DIG. 1

[56] References Cited

U.S. PATENT DOCUMENTS

| | | | |
|---|---|---|---|
| 2,793,017 | 5/1957 | Lake | 261/112 |
| 2,959,257 | 11/1960 | Campbell | 428/116 |
| 2,977,103 | 3/1961 | Smith et al. | 261/112 X |
| 3,151,675 | 10/1964 | Lysholm | 261/112 X |
| 3,260,511 | 7/1966 | Greer | 261/112 |
| 3,618,778 | 11/1971 | Benton et al. | 261/112 X |
| 3,878,272 | 4/1975 | Priestley | 261/112 |
| 3,952,077 | 4/1976 | Wigley | 261/112 |
| 4,014,962 | 3/1977 | Del Notario | 261/112 |
| 4,344,899 | 8/1982 | Monjoie | 261/112 |
| 4,361,426 | 11/1982 | Carter et al. | 261/112 X |
| 4,455,339 | 6/1984 | Meier | 428/185 |

FOREIGN PATENT DOCUMENTS

| | | |
|---|---|---|
| 21585 | 11/1969 | Australia . |
| 483705 | 3/1975 | Australia . |
| 863816 | 11/1953 | Fed. Rep. of Germany . |
| 0070920 | 2/1983 | Fed. Rep. of Germany . |
| 1591072 | 4/1970 | France . |
| 0028545 | 5/1981 | France . |
| 1226259 | 3/1971 | United Kingdom ................ 261/112 |
| 1351605 | 5/1974 | United Kingdom ....... 261/DIG. 11 |

Primary Examiner—Richard L. Chiesa
Attorney, Agent, or Firm—Murray and Whisenhunt

[57] ABSTRACT

A plate for assembly with similar plates to form a cooling tower packing and comprising a series of parallel mutually spaced ridges which are generally triangular in transverse cross-section. The ridges form means for spacing apart adjacent plates and when the plates are assembled together define opposite sides of at least one duct through which liquid is passed in contact with the duct surfaces while gas is passed through the duct to cool the liquid. The reverse sides of the ridges preferably form depressions which are V-shaped in transverse cross-section, one of which is provided in each duct.

11 Claims, 8 Drawing Figures

LIQUID/GAS CONTACT MEANS

The invention relates to liquid/gas contact means and more particularly but not exclusively to an evaporated water cooling tower packing.

It is known from UK Pat. No. 1351605 to provide such a packing which comprises a structure of tubular cells of hexagonal cross-section and which is intended to cool liquid passing downwardly in contact with the surfaces of said cells with a counterflow of cooling gas passing upwardly through said cells, in which the cells are provided with guide surfaces arranged to impart rotational motion to upwardly flowing gas passing through said cells. Such an arrangement has provided highly efficient in operation but an object of the present invention is to utilize more efficiently the available areas of the plates, which are usually thermoformed from a plastics material, from which the packing is constructed. In the case of GB Pat. No. 1351605 the tubular cells are of hexagonal cross-section and this means that considerable wastage of the available plate surfaces occurs due to the fact that the superposed plates contact one another over large areas of their surfaces.

Another object of the invention is to provide a packing which can be used both in crossflow and counterflow cooling towers.

According to the invention there is provided a plate for assembly with similar plates to form a cooling tower packing and comprising a series of parallel mutually spaced ridges which are generally triangular in transverse cross-section. Preferably the ridges form means for spacing apart adjacent sheets and define the opposite sides of at least one duct when the plates are assembled together.

The plates are preferably formed, e.g. thermoformed, from sheet material so that the reverse sides of the ridges form depressions which are V-shaped in transverse cross-section. The ridges may extend over a major part of the plate and preferably they extend over substantially the whole of the plate. The included angle between the sides of the V-shaped depression may be an acute angle, preferably not greater than 45°. Advantageously the acute angle is between 36° and 40°, and the preferred acute angle is 38°.

The transverse cross-sectional area of the depression may be between 5 and 20% of the transverse cross-sectional area defined between adjacent ridges, and advantageously is between 10 and 14%. The preferred cross-sectional area is between 12 and 13%.

Preferably the plates are formed with a series of projections disposed between the ridges, the projections being small in height in comparison with the ridges. The projections may be generally semicircular in transverse cross-section. In one embodiment I provide a projection disposed centrally of a pair of ridges and extending parallel therewith and a plurality of laterally extending projections disposed on opposite sides of the centrally disposed projection.

Preferably the arrangement is such that the length and configuration of the longitudinal projections correspond to the length and configuration of the crests of the ridges whereby the plates may be assembled one against another with the crests of the ridges received in small recesses or depressions on one side of the plates formed by the longitudinal projections so that the plates are firmly located one against another.

Preferably the plate comprises at least one first part, at least one intermediate part and at least one third part, the first and third parts being disposed in parallel planes, and the second part, which is disposed between the first and third parts being disposed in a plane which is oblique with respect to the said parallel planes. Preferably each ridge extends into all three parts of the plate. Particularly where the plates are intended for a crossflow cooling tower the ridges may be discontinuous along their lengths, and preferably the discontinuities in adjacent ridges are staggered one from the other.

From another aspect the invention provides means for effecting liquid/gas contact comprising a duct formed with a depression which extends along the duct. Preferably the depression extends over a major part of the length of the duct, and advantageously the depression extends over substantially the whole length of the duct. The depression may be generally V-shaped in transverse cross-section and the included angle between the sides of the V-shaped depression may be an acute angle. Preferably the acute angle is not greater than 45° and may be in the range 36° to 40°. The preferred angle is 38°.

The volume of the depression may be between 5 and 20% of the volume of the duct, and the preferred volume of the depression is between 12 and 13% of the volume of the duct.

The duct excluding the depression may be trapezoidal in transverse cross-sectional shape and preferably the depression is located on the longer of the pair of parallel sides of the duct. Advantageously the depression is centrally located on the longer of the pair of parallel sides.

Preferably at least one projection extends into the duct from the side thereof opposite to the depression. The or each projection may be generally semi-circular in transverse cross-sectional shape. In one embodiment there is provided a centrally disposed longitudinally extending projection and a plurality of laterally extending projections disposed on opposite sides of the centrally disposed longitudinal projection.

The entry to the duct may be of smaller transverse cross-sectional area than the interior of the duct, and preferably the duct changes direction at least once along its length. The duct may comprise an entry section and an exit section which are mutually parallel and may be co-planar and at least one obliquely extending section between the parallel sections.

From another aspect the invention is a packing for a cooling tower comprising an assembly of plates as described above.

The invention is diagrammatically illustrated by way of example in the accompanying drawings in which.

In the drawings there is shown an evaporative water cooling tower packing, which consists of a series of plates 1 thermoformed from sheet plastics material, although other materials such as stainless steel sheet might also be suitable. Each plate comprises generally flat portions 10, 11 and 12 respectively, the arrangement being such that the portions 11 and 12 are disposed in mutually parallel planes and are separated by the portions 10, the planes of which extend obliquely to the planes of the portions 11 and 12. The portions 10 are somewhat larger in size than the portions 11 and 12. The plate has marginal portions 14 on opposite sides, which portions 14 are co-planar with the portion 12 and from which extend side walls 5 which connect to the opposite edges of the portions 10 and 11 to lend rigidity to the plate. Abutments 6 project from the side walls 5 to assist stacking of a series of the plates one upon the other to form the packing. Stacking of the sheets is more fully described below.

Figure 1:
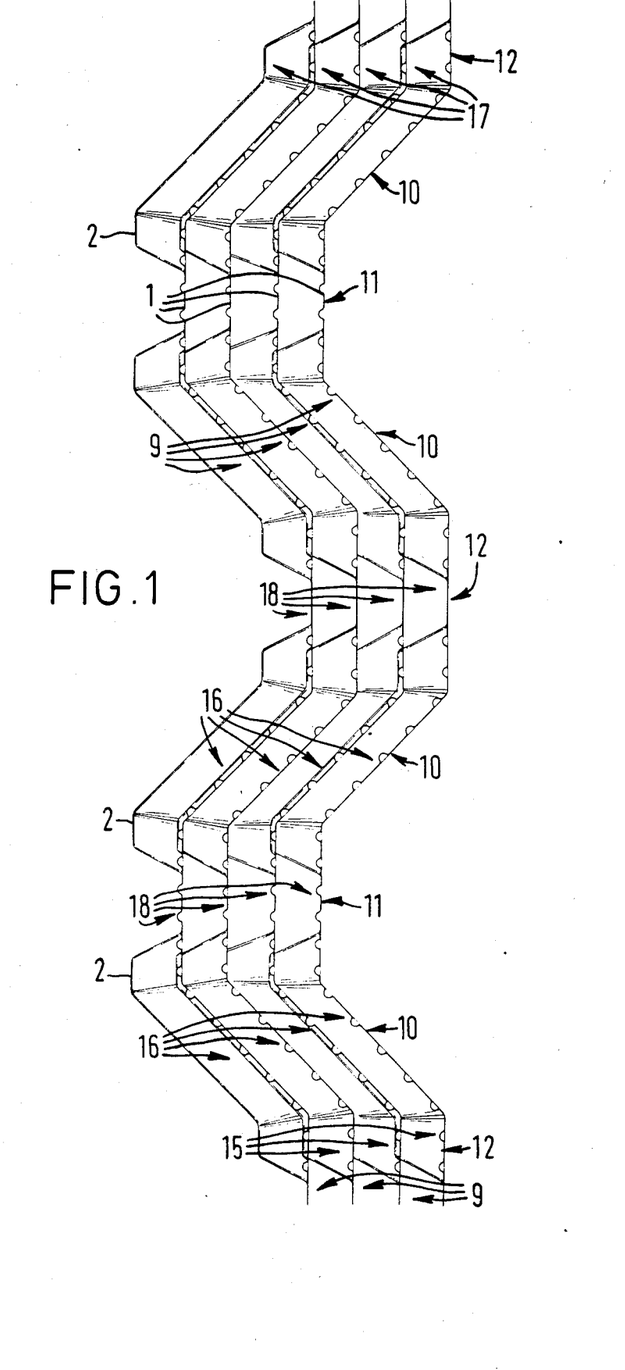
FIG. 1 is a sectional side view of a stack of plates assembled to form a packing for a cooling tower.

Each plate is formed with a series of parallel mutually spaced ridges 2 which may extend continuously from one end of the plate to the other. As shown in FIG. 1 however each ridge starts in a portion 11, extends through a portion 10 and is interrupted by a short gap in each portion 11. Each ridge is triangular in transverse cross-section. The surfaces of the portions 10, 11 and 12 between the ridges 2 are each formed with a projection or bead 3 disposed centrally between an adjacent pair of ridges and extending parallel thereto and over substantially the whole length thereof. A transverse bead of projection 7 is disposed at the end of the projection 3 in the portion 12 and a similar transverse projection 8 is disposed at the end of the projection 3 in the portion 11. Along the length of the projection 3 are disposed a series of transverse projections 4 arranged on opposite sides of the projection 3. As seen in the drawings both of the projections 7 and 8 are disposed adjacent to, but out of contact with, the ends of the projection 3 and also the ends of the projections 7 and 8 are disposed adjacent to, but out of contact with, the ridges 2. Similarly the ends of the projections 4 are out of contact with the projection 3 and the ridges 2. It might however be desirable to continue the projections 3, 4, 7 and 8 to meet one another and the ridges 2 to inhibit the formation of rivulets of water.

Figure 3:
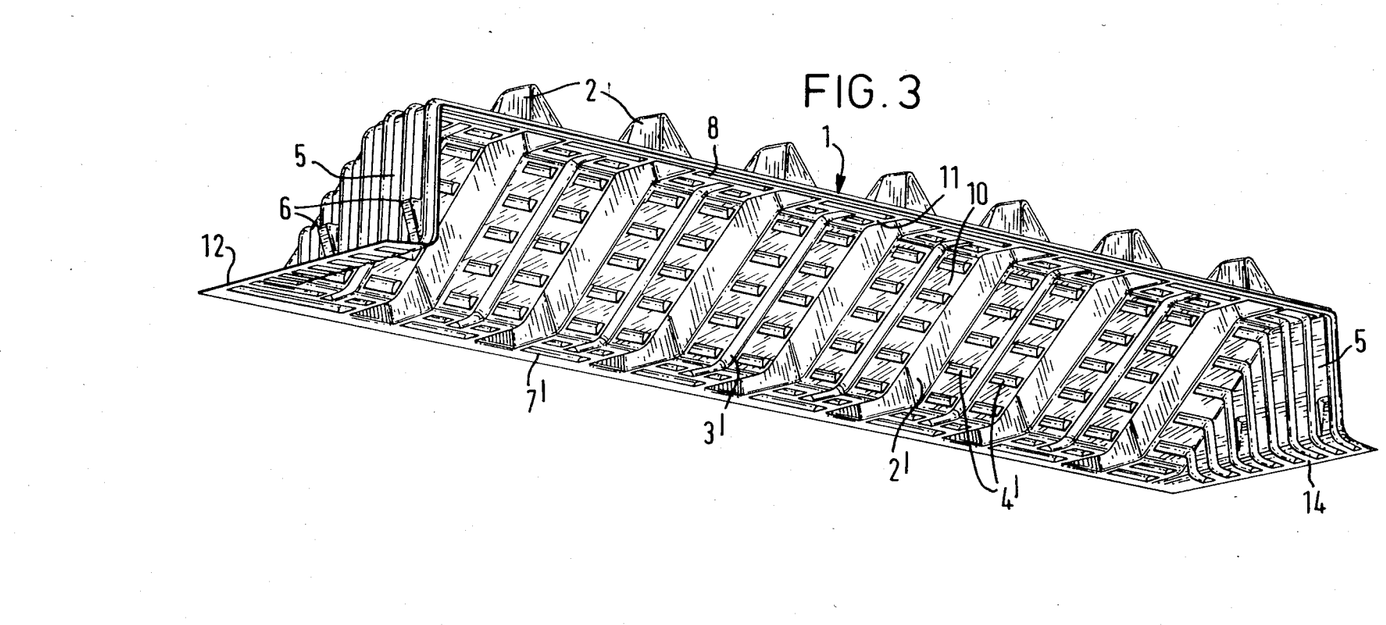
FIG. 3 is a perspective view of the part of a packing sheet or plate shown in FIG. 2 and taken in the direction of the arrow A of FIG. 2.
Figure 4:
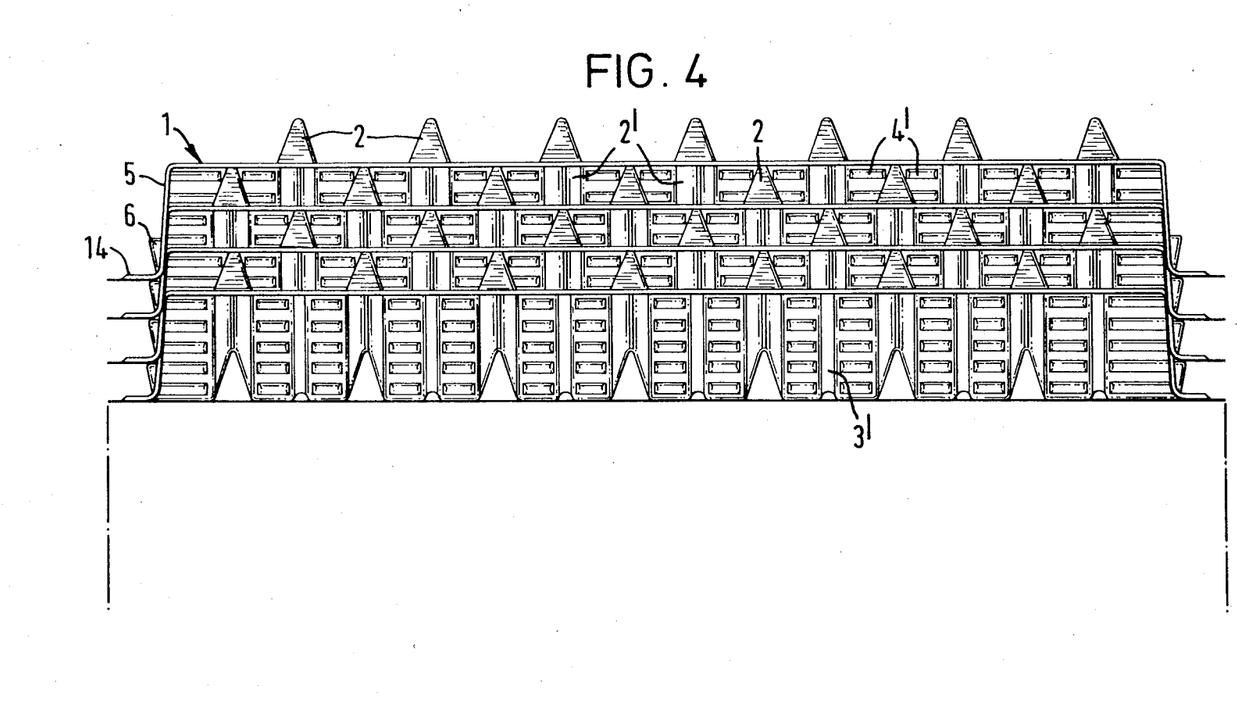
FIG. 4 is an end elevation of a stack of plates of the kind shown in FIGS. 1 to 3 assembled together to form a cooling tower packing.
Figure 5:
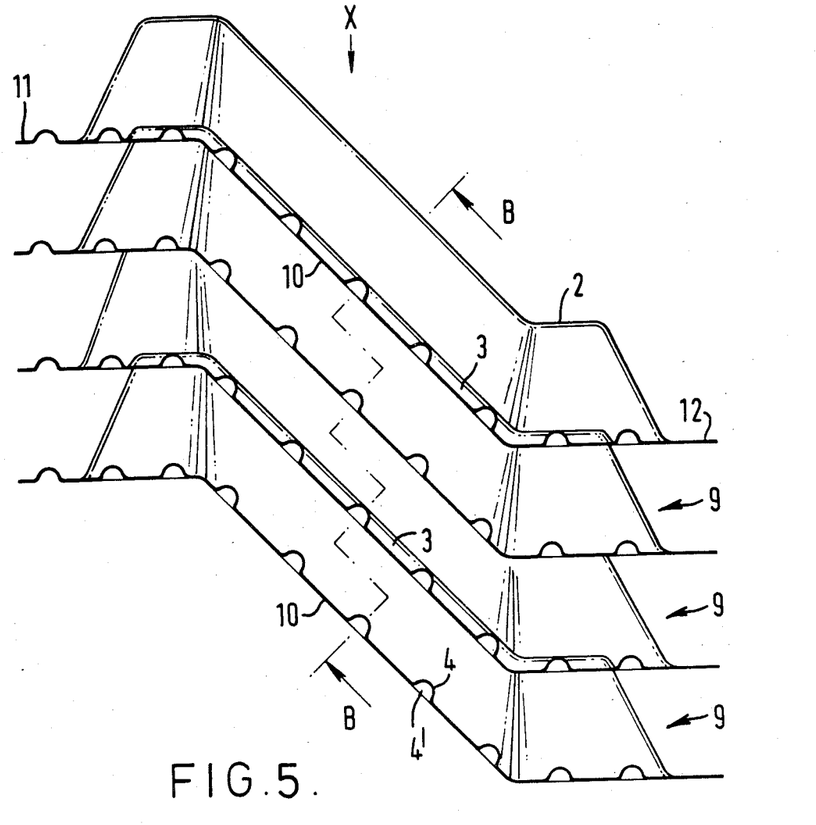
FIG. 5 is an enlarged sectional side view of part of the stack of plates of FIG. 1.

Since the plate is made from sheet material the undersurface of each plate is formed (as shown in FIG. 3) with recesses or depressions corresponding to the longitudinal projections 3, the transverse projections 4, 7 and 8 and the ridges 2. Thus the depressions corresponding to the ridges 2 are indicated at 2', and similarly the recesses or depressions corresponding to the longitudinal projections 3 are shown at 3', and the depressions corresponding to the transverse projections 4, 7 and 8 at 4', 7' and 8' respectively.

The plates described above are stacked together to form a packing as shown in FIGS. 1 and 4 to 6 and comprising a plurality of sinuous ducts 9 through which water is passed under the action of gravity so that the water flows as a film over the surface of the ducts while air is forced in countercurrent through the ducts to cool the water, e.g. by evaporation. As already mentioned the sides 5 of the plates are formed with projections 6 and these projections are arranged to abut against the undersides of the marginal portions 14 of the adjacent plates to achieve the correct spacing between the plates.

In addition the crests of the ridges 2 locate in the depressions 3' formed by the undersurfaces of the projections 3.

Figure 6:
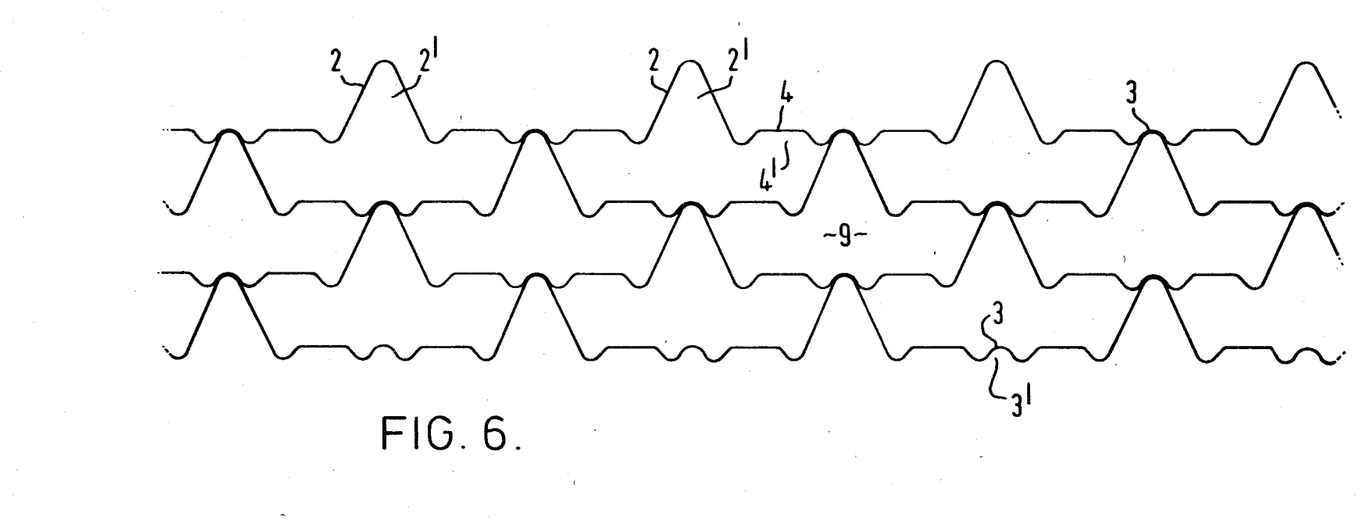
FIG. 6 is a part section on the line B—B of FIG. 5.

As can best be seen in FIG. 6, each duct 9 is generally trapezoidal in transverse cross-section and is defined on opposite sides by an adjacent pair of ridges 2. One of the pair of parallel sides of each duct 9 is formed with the projections 3, 4, 7 and 8 while the opposite sides is formed with small depressions 4' and with a large centrally disposed longitudinal depression 2'.

In a typical example of cooling tower evaporative packing the angle between the walls of the depression 2' is 38°, and the volume of the depression 2' represents around 13% of the volume of the duct as a whole. Preferably the mean hydraulic radius of the duct, i.e. the cross-sectional area of the duct divided by the length of the perimeter of the duct, is around 8.75.

As can be seen in FIG. 1, each duct 9 comprises an entrance section 15 defined by the lower-most portions 12 of adjacent pairs of plates, four obliquely extending sections 16 defined by the portions 10 of adjacent pairs of plates, three intermediate sections 18 defined between portions 11 of adjacent plates and an exit section 17 defined by the uppermost portions 12 of adjacent pairs of plates. It will be seen that the ridges 2 and projections 3, 4, 7 and 8 terminate short of the entrances to the ducts 9 so that the cross-sectional area of each duct entrance is smaller than the cross-sectional area of the interior of the duct. This is also true of the duct exits. Since the ridges 2 are discontinuous in the intermediate sections 18, the ducts communicate with one another which will help to distribute evenly the water to be cooled to prevent overload of some ducts.

Figure 7:
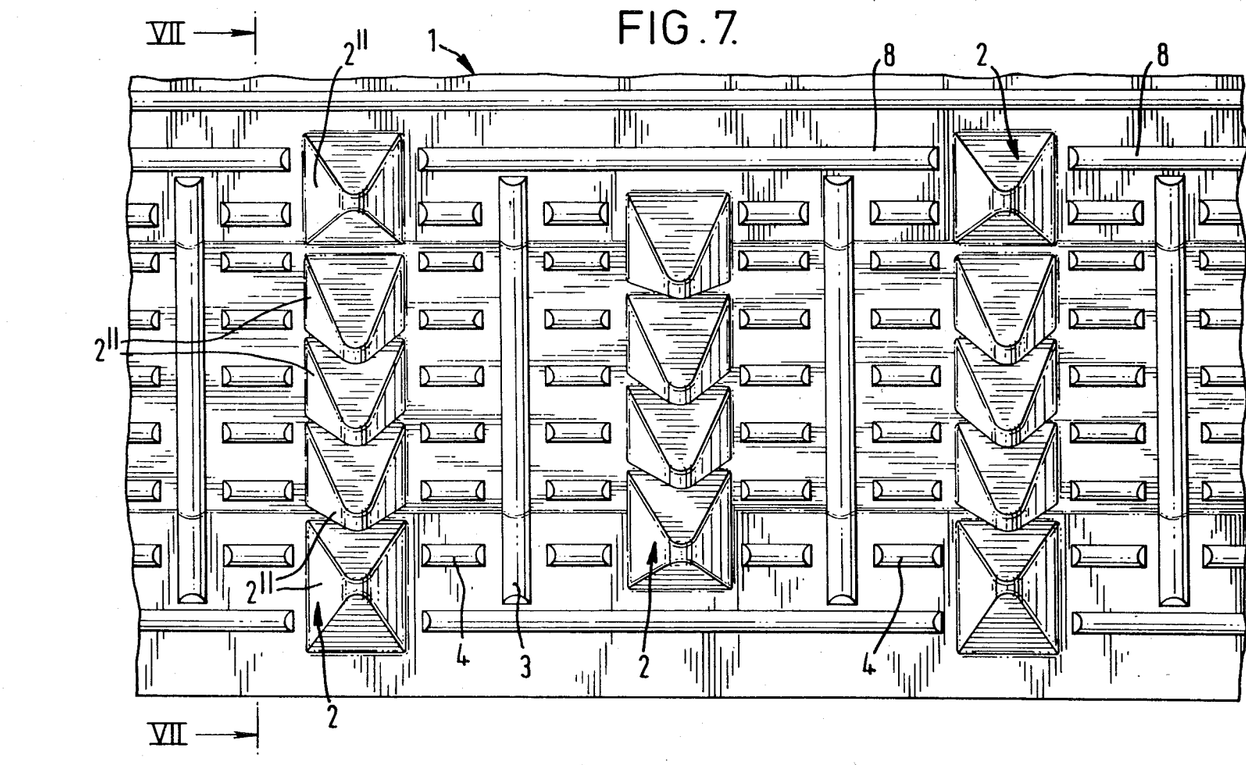
FIG. 7 is a part plan view of a modified plate.
Figure 8:
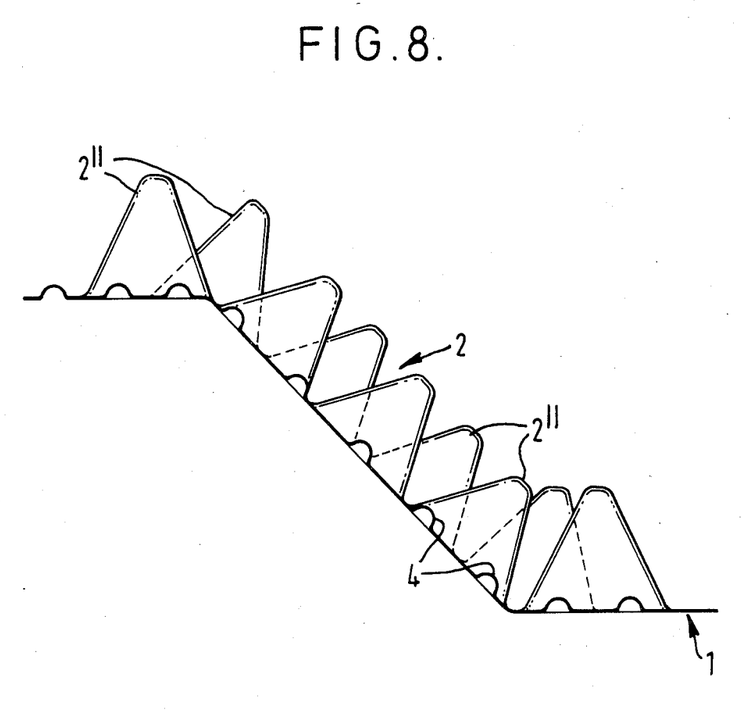
FIG. 8 is a sectional view of the modified plate of FIG. 7.

In FIGS. 7 and 8 there is shown a modified plate more particularly intended for use in a crossflow cooling tower. The plate is generally similar to that described above except that each ridge 2 is discontinuous in the portions 10 of the plate and is divided into a series of generally pyramidal members 2" to permit air to be blown cross-wise through an assembly of plates. As can be seen the members 2" in each ridge are staggered to force the cooling air to follow a sinuous path through the packing. It will be appreciated that the members 2" may have shapes other than pyramidal and still achieve the same effect.

Figure 2:
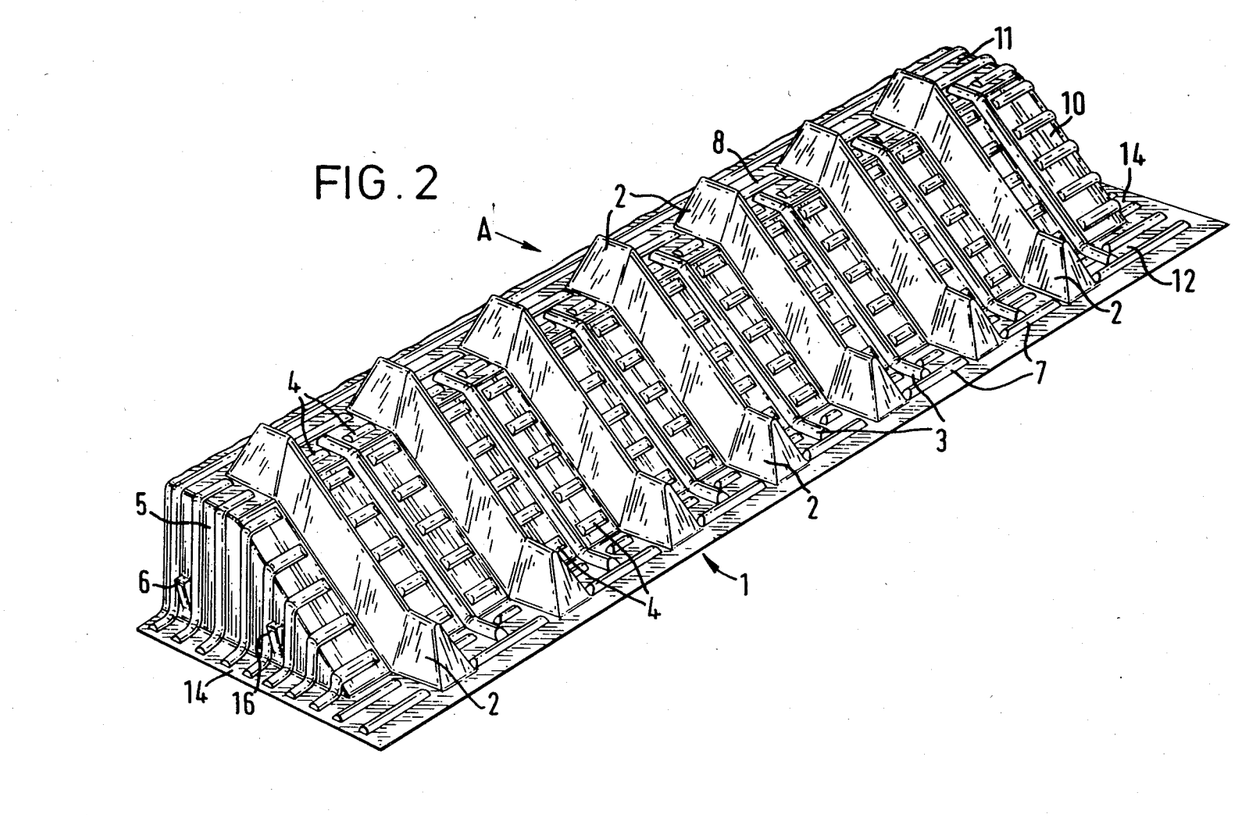
FIG. 2 is a perspective view of part of a packing sheet or plate for a cooling tower in accordance with FIG. 1.

To enable stacking to occur it will be noticed from FIGS. 2 and 3 that the ridges 2 although equi-spaced one from another are asymmetric on the surface of the plate. To assemble the stack one plate is turned through 180° with respect to the adjacent plates so that the ridges 2 on one plate are staggered from the ridges 2 of the adjacent plates. The edges of the plates may be secured one to the other by glue and/or may be mounted in a surrounding framework. Before the plates are turned as described above to assemble the stack, they rest one within the other and so take up the minimum space for storage and transport.

I claim:

1. A plate for assembly with similar plates to form a cooling tower packing, the plate being formed from thin sheet material and comprising:

a first part, a second part and a third part, said first and third parts being disposed in parallel planes, and said second part being disposed between said first and third parts in a plane which is oblique with respect to said parallel planes; and a series of parallel mutually spaced ridges which are generally triangular in transverse cross-section, said ridges extending over a major part of said plate, said ridges having reverse sides forming depressions which are V-shaped in transverse cross-section, the included angle between the sides of each V-shaped depression being an acute angle, said ridges being arranged such that each ridge extends into said first, second and third parts of said plate.

2. A plate according to claim 1, wherein said ridges form means for spacing apart adjacent plates, said ridges defining opposite sides of at least one duct when said plates are assembled together.

3. A plate according to claim 1, wherein said ridges extend over substantially the whole of said plate.

4. A plate according to claim 1, wherein said acute angle is not greater than 45°.

5. A plate according to claim 4, wherein said acute angle is between 36° and 40°.

6. A plate according to claim 1, wherein each depression has a transverse cross-sectional area of between 5 and 20 percent of a transverse cross-sectional area defined between adjacent ridges.

7. A plate according to claim 6, wherein said transverse cross-sectional area on said depression is between 10 and 14 percent of said transverse cross-sectional area defined between adjacent ridges.

8. A plate according to claim 1, and further comprising a series of projections disposed between said ridges, said projections being small in height in comparison with said ridges.

9. A plate according to claim 8, wherein said projections are generally semi-circular in transverse cross-section.

10. A plate according to claim 8, and further comprising a projection disposed centrally of a pair of ridges and extending parallel with said ridges, and a plurality of laterally extending projections disposed on opposite sides of said centrally disposed projection.

11. A packing for a cooling tower comprising an assembly of plates as claimed in claim 1.

* * * * *